UNITED STATES PATENT OFFICE.

JOSEPH C. MANNING, TRUSTEE, OF BALTIMORE, MARYLAND, ASSIGNEE, BY MESNE ASSIGNMENTS, OF WILLIAM PETERS, DECEASED.

IMPROVEMENT IN PACKING FOR STEAM AND OTHER ENGINES.

Specification forming part of Letters Patent No. 34,283, dated January 28, 1862; reissue No. 6,688, dated October 11, 1875; application filed June 8, 1875.

*To all whom it may concern:*

Be it known that WILLIAM PETERS, deceased, late of the city and county of Baltimore and State of Maryland, did invent a Packing for Steam, Water, and other Joints, Cylinder-Heads, and Stuffing-Boxes or Pistons, of which the following is a specification:

This invention consists in the novel preparation, forming, and use of the mineral known as asbestus as a packing for steam, water, and other joints, cylinder-heads, and stuffing boxes or pistons, it having been discovered by the said PETERS to be pecularly useful in high-pressure engines, and in all machines or apparatus where exposure to a high degree of heat occurs, and when great pressure is exerted, and where packing is subjected to the action of acids or other corrosive fluids.

Any animal or vegetable fiber or material that can be brought to the consistence of pulp can be used with the asbestus to form a packing for the purposes above set forth; but there may be circumstances, such as the degree of heat or of moisture, which will lead to a preference for one material over another, its office being to aid the asbestus to cohere in the form given it, the necessities of which office will determine the proportion of such material to be used.

Flax, wool, and cotton have been used in making the packing; but either one of these articles alone, or the whole, may be used with the asbestus.

A method of making the packing practiced by the inventor was placing layers of asbestus and layers of flax or wool alternately in a tub of water, through the bottom of which entered tubes conveying steam. In this way the materials were subjected to the heat of the steam, and the mass made to assume the condition of pulp. After exposing the mass for a sufficient length of time to bring it to the pulpy condition it was taken out, laid upon an even surface, and compressed into plates or boards of the thickness required. For packing the heads of cylinders, one-quarter of an inch thickness of board will answer, but, as is evident, any degree of thickness can be produced.

Other means of exposing the mass to heat in a fluid can be adopted, and other fluid than water may be used, as the use or purpose for which the packing may be intended may indicate.

It is now well known that when asbestus, combined with any animal or vegetable fiber or envelop, is packed in places where the mass is exposed to a high degree of heat, friction, or pressure, or acids or other corrosive agents—as, for instance, in cylinder-heads or stuffing-boxes and around joints where it is exposed to superheated steam—the animal or vegetable fiber which is brought into contact with the destructive agents is speedily consumed or disintegrated and worn away, leaving the asbestus, which alone will withstand these destructive agencies a much longer time. Wherefore it is apparent that the animal or vegetable fiber serves no useful purpose except to hold the asbestus together until it is put into place for use, and that upon exposure to these destructive agencies the asbestus alone remains as the effective packing.

The proportion of the animal or vegetable fiber necessary to accomplish its function, as above indicated, must depend upon the length and strength of the fiber of the asbestus, which varies greatly, the distance which the packing is to be transported before use, and the roughness of the handling which it must undergo before it is put in place for use, and the most exact direction which can be given is to use just as much animal or vegetable fiber as is necessary to cause the asbestus to cohere in the form given to it.

For packing stuffing-boxes and pistons the mass may be compressed in molds to the form desired.

I claim as the invention of said PETERS—

1. Asbestus combined with vegetable or animal fiber or other material, as and for the purposes above set forth.

2. Asbestus applied and used around steam, water, and other joints, where it is useful to resist high degrees of heat, pressure, and other destructive agents, as above set forth.

3. Asbestus packing compressed into the required form and dimensions, as and for the purposes above described.

JOS. C. MANNING,
*Trustee of the Baltimore Patent Mineral Packing Company and Horatio D. Jarves.*

Witnesses:
P. DICKERSON,
G. HUME SIMPSON.

BEST AVAILABLE COPY